M. S. WALES.
COLANDER.
APPLICATION FILED MAY 17, 1915.
1,203,820.
Patented Nov. 7, 1916.
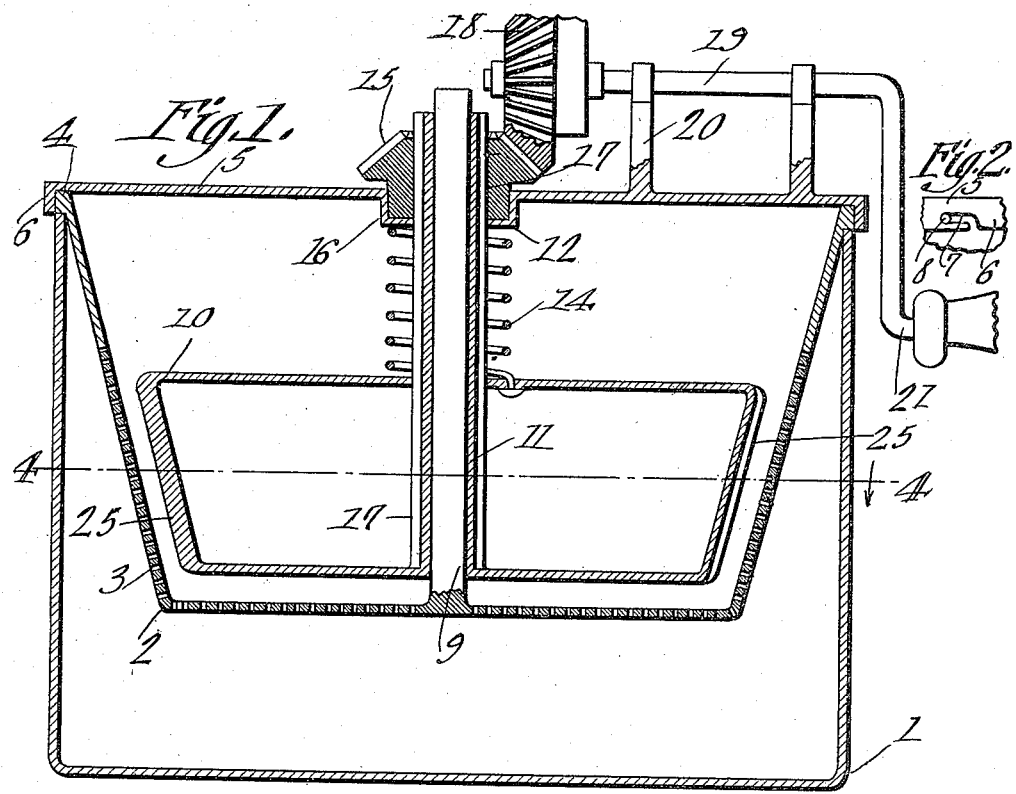
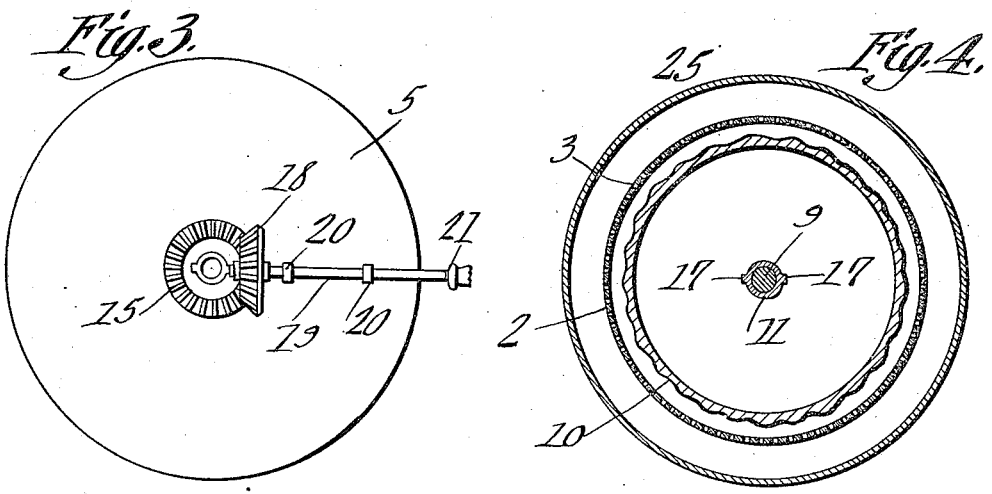
Marie Stewart Wales
Inventor
Witnesses
by
Attorneys

UNITED STATES PATENT OFFICE.

MARIE STEWART WALES, OF OAK CREEK, COLORADO, ASSIGNOR OF ONE-FOURTH TO MARGARET BAILEY AND ONE-FOURTH TO ROSE MAY SIEVERS, BOTH OF OAK CREEK, COLORADO.

COLANDER.

1,203,820.   Specification of Letters Patent.   Patented Nov. 7, 1916.

Application filed May 17, 1915.   Serial No. 28,685.

*To all whom it may concern:*

Be it known that I, MARIE STEWART WALES, a citizen of the United States, residing at Oak Creek, in the county of Routt and State of Colorado, have invented a new and useful Colander, of which the following is a specification.

The device forming the subject matter of this application is a colander and the invention aims to provide a means whereby the contents of the colander may be squeezed therethrough without exerting manual pressure, the operation above contemplated being carried out through the medium of a vertically movable, resiliently depressed rotatable compression member.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in vertical longitudinal section; Fig. 2 is a fragmental side elevation showing a portion of the lid holding means; Fig. 3 is a top plan; Fig. 4 is a cross section on the line 4—4 of Fig. 1.

In carrying out the invention there is provided a vessel 1 within which is located a foraminous container 2 provided with perforations 3 in its side walls and in its bottom. The container 2 is of inverted frusto-conical form, the side walls of the container 2 being spaced from the side walls of the vessel 1 and the bottom of the container being spaced from the bottom of the vessel. The vessel 1 and the container 2 preferably are of circular section, the container being provided adjacent its upper edge with a bead 4 resting on the upper edge of the vessel 1. A lid 5 is securely but detachably held on the container 2 and any suitable means may be provided for accomplishing the result above mentioned. As shown, the lid 5 comprises a depending flange 6 having a plurality of bayonet slots 7, one of which is shown in Fig. 2, the bead 4 having projections 8 which engage with the bayonet slots 7.

Fixed to and upstanding from the bottom of the container 2 is a standard 9. The invention comprises a compression member 10 carrying a tubular bearing 11 which is mounted to slide on the standard 9 and to rotate thereon. The bearing 11 is also journaled in a depressed seat 12 formed in the lid 5. A compression spring 14 abuts against the seat 12 and against the top of the compression member 10 and constitutes a means for depressing the latter.

A beveled pinion 15 is provided, the same comprising a hub 16 journaled in the seat 12 of the lid 5, the beveled pinion surrounding the tubular bearing 11. The beveled pinion 15 and the bearing 11 are splined together as shown at 17 so that the compression member 10 may move vertically without losing its operative connection with the pinion 15. The pinion 15 is rotated by a beveled pinion 18 secured to a shaft 19 journaled for rotation in brackets 20 upstanding from the lid 5. The shaft 19 is equipped at its outer end with a crank 21 moving beyond the contour of the vessel 1.

In practical operation, a quantity of fruit or other material is placed in the container 2, the compression member 10 being elevated. The tendency of the spring 14 is to press the compression member downwardly and to force the material out through the perforations 3 of the container 2, the material being received in the vessel 1. The compression member 10 is rotated through the medium of the tubular bearing 11, the beveled pinion 15, the beveled pinion 18 and the shaft 19, the compression member 10 being free to move downwardly under the action of the spring 14, as the compression member is rotated, due to the presence of the splined connection 17 between the tubular bearing 11 and the beveled pinion 15. If desired, in order to increase the efficiency of the compression member 10, the same may be provided upon its periphery with longitudinal ribs 25.

Having thus described the invention, what is claimed is:—

1. In a device of the class described, a vessel; a foraminous container extended within the vessel and supported on the vessel; a lid for the container; a fixed standard secured to the bottom of the container and projecting upwardly through the lid; a compression member in the container; a tubular bearing carried by the compression member and mounted on the standard to rotate and to slide thereon, the bearing projecting upwardly through the lid; a compression spring surrounding a part of the bearing, the upper end of the spring abutting against the lid and the lower end of the spring abutting against the compression member; and a wheel supported on the lid, the standard and the bearing passing through the wheel, the bearing being keyed to the wheel to connect the wheel and the bearing for simultaneous rotation, and to permit the compression member to move upwardly and downwardly.

2. In a device of the class described, a vessel; a foraminous container extended within the vessel and supported on the vessel; a lid for the container; a fixed standard secured to the bottom of the container and projecting upwardly through the lid; a hollow compression member in the container and including a top and a bottom; a tubular bearing connecting the top and the bottom of the compression member to serve as a reinforcement therefor, the bearing being mounted on the standard to rotate on the standard and to slide on the standard, the bearing extended upwardly through the lid; a compression spring surrounding part of the bearing, one end of the compression spring abutting against the top of the compression member, the other end of the compression spring abutting against the lid; a wheel supported on the lid, the bearing and the standard passing through the wheel, the bearing being keyed to the wheel to secure the simultaneous rotation of the wheel and the bearing, and to permit the compression member to rise and fall.

3. In a device of the class described, a vessel; a foraminous container extended within the vessel and supported on the vessel; a lid for the container; a fixed standard secured to the bottom of the container; a compression member in the container; a tubular bearing carried by the compression member and mounted to rotate on the standard and to slide thereon, the bearing projecting upwardly through the lid; a compression spring surrounding a part of the bearing, the lower end of the compression spring abutting against the compression member, and the upper end of the spring abutting against the lid; and a wheel supported on the lid, the bearing passing through the wheel and being keyed thereto, to secure a simultaneous rotation of the wheel and the compression member, and to permit the compression member to rise and fall.

In testimony that I claim the foregoing as my own, I have hereto affixed my signature in the presence of two witnesses.

MARIE STEWART WALES.

Witnesses:
  E. W. NORLIN,
  JAMES M. BAILEY.

Copies of this patent may be obtained for five cents each, by addressing the "Commissioner of Patents, Washington, D. C."